Inventor
Emil R. Ouimet

Jan. 31, 1967   E. R. OUIMET   3,300,800
RIB-APPLYING MACHINE
Filed May 14, 1963   5 Sheets-Sheet 3

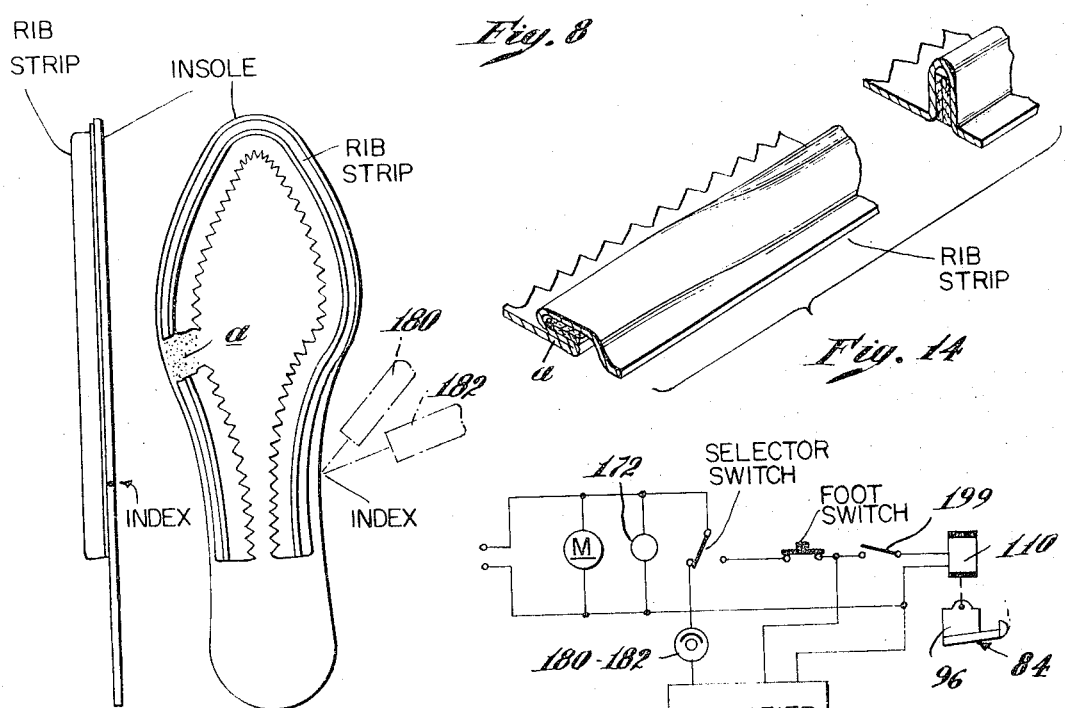

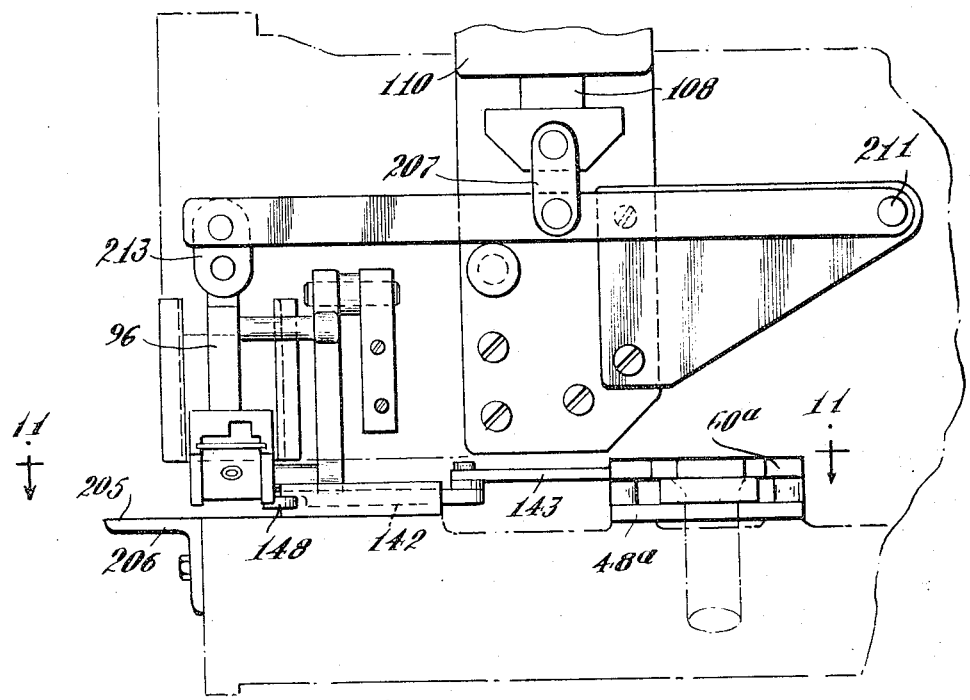
Fig. 9
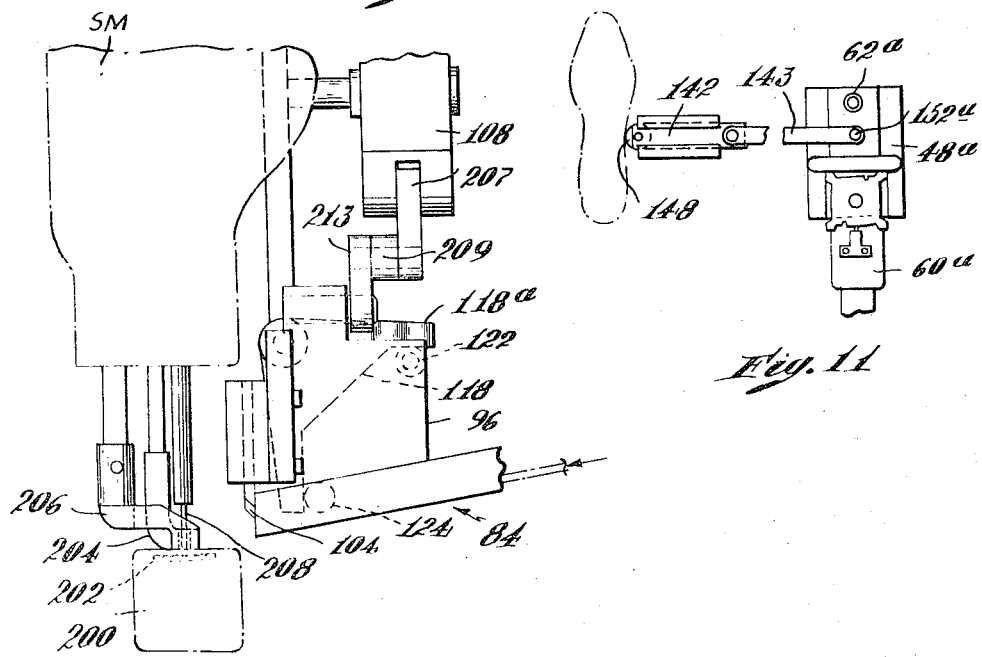
Fig. 10
Fig. 11

# United States Patent Office 3,300,800
Patented Jan. 31, 1967

3,300,800
RIB-APPLYING MACHINE
Emil R. Ouimet, Brockton, Mass., assignor to Shoe Tech Inc., Nashville, Tenn., a corporation of Tennessee
Filed May 14, 1963, Ser. No. 280,774
16 Claims. (Cl. 12—20)

This invention relates to machines for use in the manufacture and more especially to applying a rib to the marginal edge of an insole.

The principal objects of the invention are to provide a machine for applying a rib strip continuously from about the breast line of the heel at one side of an insole, forwardly along the shank, about the forepart along the side, around the toe, along the forepart on the other side and rearwardly along the shank to about the breast line on that side; to provide a machine in which the position of the rib strip may be varied during application so that it is furthest from the edge at the shank, closest to the edge around the forepart and at an intermediate position around the toe; to provide a machine in which the rib strip is guided freely to the place of application and is pressed into engagement with the sole by pressure applied predominantly perpendicular to the insole and concomitantly moved lengthwise with the insole; to provide a machine with improved shearing means for cutting the rib strip at the end of the applying operation; to provide a machine with improved feeding means for advancing the leading end of the rib strip after cutting into a position for application to the next insole; to provide a machine with means for automatically cutting the strip when the proper length has been laid about the edge of the insole; to provide a machine for applying a rib strip which has been previously coated with an adhesive which is normally non-tacky and requires activation prior to application to the insole; to provide a machine for applying a rib strip to an insole; the margin of which has been previously coated with a non-tacky adhesive which requires activation prior to application of the rib strip thereto; to provide a machine in which the activation of the adhesive will not interfere with free movement of the rib strip to its place of application; to provide a machine which may optionally insert a line of stitching along one of the marginal edges of the rib strip to strengthen the attachment of the strip to the insole where either the strip or the insole, or both, are comprised of a material that is weak; and to provide a machine which is relatively simple in construction and operation.

As herein illustrated, the machine comprises, in combination, a sole support, an edge guide, means cooperable with the sole support, by engagement with the margin of the sole on the support, to move the peripheral edge of the sole lengthwise relative to the edge guide, and a strip guide for conducting a rib strip to a position for engagement with the insole at the place of operation of the first means; means for supporting the edge guide for movement widthwise of the strip to effect displacement of the sole relativxe to the strip, said means being freely movable by the operator throughout peripheral movement of the sole relative to the edge guide, to permit positioning the strip at different distances from the edge of the sole according to the portion of the sole to which it is being applied at any given time. The edge guide is mounted on a support for movement relative to the sole support and movement is effected by a pivoted lever, one end of which is connected to the support. A gauge block is cooperable with the other end of the lever to control movement of the lever between maximum and minimum limits for location of the strip on the sole. The gauge block contains a plurality of recesses of different lengths selectively cooperable with the lever to limit its pivotal movement, each recess representing the limits for a sole of predetermined size. The sole support is mounted on a support for movement from an operative position adjacent the first means to an inoperative position and the edge guide and control lever are movable therewith, the latter providing means for effecting movement of the sole support into and out of operative position and, in addition, to effecting movement of the edge guide. Normally the support for the sole support is held in operative position by a stiff spring. A toggle, connected to the support, is operable, by movement of the support to its inoperative position, to hold it in its inoperative position. The first means comprises a pair of feed feet supported vertically above the sole support operable, by eccentrics, to move relatively with respect to the sole support to apply pressure perpendicular to the rib strip followed by movement in a direction parallel to the sole to effect feeding movement. Application of pressure predominantly perpendicular to the rib strip is effected by supporting the feed feet for movement about vertically spaced axes above and parallel to the plane of the sole. The rib strip guide is fixed relative to the transverse dimension of the sole support but movable vertically and contains an elongate passage for receiving the flanges of the rib strips and a narrow groove for erecting and supporting the rib perpendicular to the flanges. The bottom of the strip guide is coated with Teflon to prevent sticking of the rib strip and its forward end, at least, is hardened to provide one component of a shearing element. The other component is a thin blade secured adjacent the end of the guide with its cutting edge above and inclined to the shearing edge at the bottom of the strip guide. Cutting is effected by elevating the strip guide and such movement is provided for by a solenoid. A feed pin is mounted in one side of the strip guide which is slidable rearwardly along the guide by a lever operable in consonance with the operation of the cutter. Following cutting the pin is movable forwardly along the guide by spring means to advance the strip from the guide a sufficient distance to engage its leading end with the feeding means preparatory to the next operation. Preferably the cutting is effected automatically by sensing means operable, in response to a mark on the sole, to close the circuit containing the solenoid. The sensing means comprises a light source and light sensitive cell arranged so that light from the light source is reflected from the edge of the sole to the light sensitive cell. Heating means in the form of conductors are provided, one of which enters the bottom of the strip guide so as to activate the adhesive on the underside of the strip just before it leaves the strip guide, and the other of which is located between the guide and the feeding means to eject heated air on the top surface of the sole at approximately the place where the strip is brought into engagement with the sole. Heated air is supplied to the conductors by a pump and a heating element through which the air is forced by the pump to the conductors. In one form of the invention, the sole support is a relatively large roller supported for rotation about a horizontal axis and the edge guide is a smaller roller mounted for rotation on an axis perpendicular to the axis of the sole supporting roller and so located that its surface is partly above and partly below the top of the sole supporting roller. Optionally, the sole supporting roller and feeding feet may be replaced by a sewing machine arranged with its table in a position to support the insole with its edge engaged with the edge guide. The table includes a feed dog and there are feed feet and a needle above the table operable to apply pressure perpendicular to the feed strip to press it against the insole, movement along the table, and insert a line of stitching through the margin outwardly of the rib.

The invention will now be described in greater detail with reference to the accompanying drawings wherein:

FIG. 7 is a plan view of the strip guide, to much larger scale, broken away in section and part;

FIG. 8 is an elevation of the strip guide shown in FIG. 7;

FIG. 9 is an elevation of the head modified to provide for sewing the rib strip to the insole;

FIG. 10 is an elevation taken from the left side of FIG. 9 showing the table, feeding feet and needle of a sewing machine situated adjacent the lower end of the rib strip guide;

FIG. 11 is an elevation taken on the line 11—11 of FIG. 9;

FIG. 12 is a plan view of an insole with a rib strip applied thereto;

FIG. 13 is an edge view of the insole showing an index mark;

FIG. 14 is a perspective of the rib strip before and after the rib is erected; and FIG. 15 is a diagram of the electrical circuit.

Figure 1:
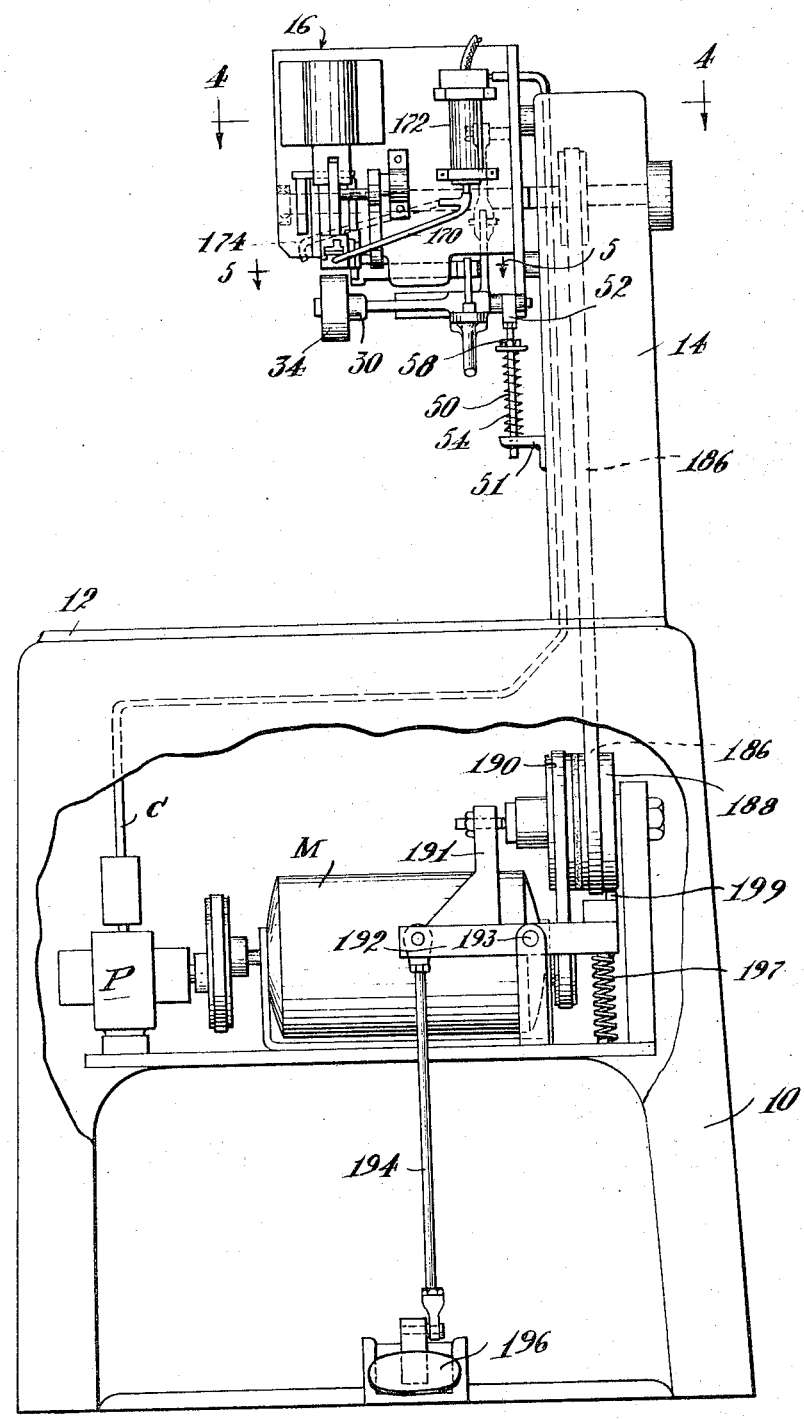
FIG. 1 is a front elevation of the machine broken away in part to show the driving means within the base.

Referring to the drawings, the machine has a hollow base 10 of substantially rectangular horizontal section adapted to contain the driving mechanism and a horizontal table 12, from one side of which rises a hollow post 14, at the upper end of which there is a horizontally projecting head 16 substantially parallel to the top of the table comprised of vertically disposed side walls 18 and 20 and front and back walls 22 and 24.

Figure 4:
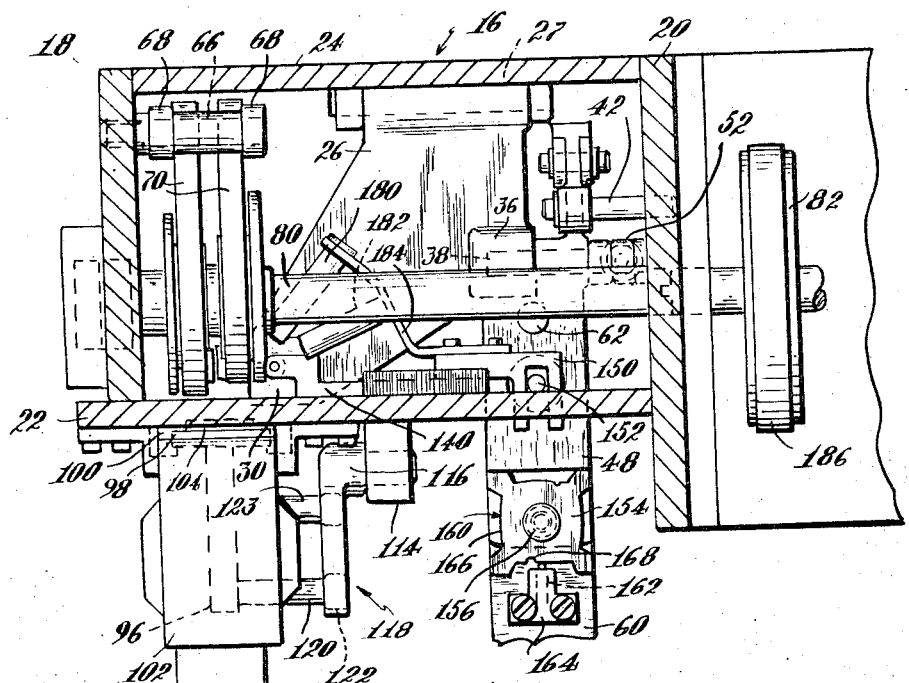
FIG. 4 is a horizontal section taken on the line 4—4 of FIG. 1 to much larger scale.

A support 26 (FIGS. 2 and 4) is pivotally mounted at its rear end on a pin 27, the latter being supported in a horizontal position parallel to the back wall 24, between a pair of spaced parallel ears 28—28 formed at the lower edge of the back wall. The support 26 extends forwardly from the back wall toward the front wall and has, at its forward end and at its left side, a bearing 30 in which there is fixed a pin 32 upon which there is mounted a relatively large diameter roller 34, the latter providing a supporting element for an insole or other shoe bottom element to which a rib strip is to be attached.

The support 26 has, intermediate its rear and forward ends and at its right side, a boss 36 within which there is fixed a pin 38, the latter extending horizontally away from the support toward the wall 20. A link 40 (FIG. 2) is supported at its upper end between the support 26 and the wall 20 on a pin 42 fixed in the wall and is pivotally connected at its lower end by a pin 44 to the upper end of a link 46. The lower end of the link 46 is pivoted on the pin 38.

An arm 48 (FIG. 4) is formed integral with the support 26 and extends forwardly therefrom for a purpose which will appear hereinafter. The support 26 and the arm 48 are held in a substantially horizontal position by a rod 50 (FIG. 1), the upper end of which has secured to it a bearing 52 mounted on the pin 38, and the lower end of which is loosely guided in a bracket 51 secured to the post 14. A spring 54 is mounted on the rod 50 with its lower end resting on the bracket 51 and its upper end abutting adjusting nuts 58 threaded on the rod 50. The adjusting nuts 58 provide for increasing the resistance to downward displacement of the support and consequently of the roller 34.

As indicated, the roller 34 is normally held in an operative position, however, it may be lowered to an inoperative position by depression of the arm 48 which will straighten the links 40 and 46, moving their adjacent pivoted ends forwardly of their distal ends so that the support will be held displaced downwardly until the arm 48 is forcibly raised to break the toggle action of the links 40 and 46.

A lever 60 (FIGS. 2 and 4) is pivotally secured to the underside of the arm 48 by a pin 62 for a purpose which will be described hereinafter, extends forwardly from the forward end of the arm 48 and has on it a handle 64 which provides convenient means for effecting lowering and raising of the support and hence of the roller 34.

A pin 66 is secured in the wall 18 of the head adjacent the back wall 24 and pivotally supports the upper ends of a pair of links 68—68 (FIGS. 2 and 4), the lower ends of which support a pin 69 upon which are pivotally mounted the rear ends of a pair of flat plates 70—70. The plates 70—70 extend forwardly from the supporting pin 69 and each has secured to its lower edge a block 72 having a downwardly projecting foot 73 situated vertically above the upper surface of the roller 34. As will be seen by reference to FIG. 6, each foot has a flat face for engagement with the flange of the rib strip and one has a groove 74 for receiving the upstanding rib. The plates 70—70 contain openings 76—76 for receiving eccentrics 78—78, the latter being fixed to a horizontal shaft 80 (FIG. 4) journaled at its opposite ends in the walls 18 and 20. The right-hand end of the shaft 80 is connected to a pulley 82 by means of which it is rotated. As thus constructed, the feet 73—73 are oscillated vertically and horizontally to provide a walking action about the axes of the pins 66 and 69. By supporting the rear ends of the plates 70—70 for pivotal movement about vertically spaced axes, above and rearwardly of the feet, the latter are caused to apply their pressure substantially perpendicular to the plane of the sole to press the strip into engagement therewith prior to movement parallel to the sole for effecting the feeding movement.

Figure 2:
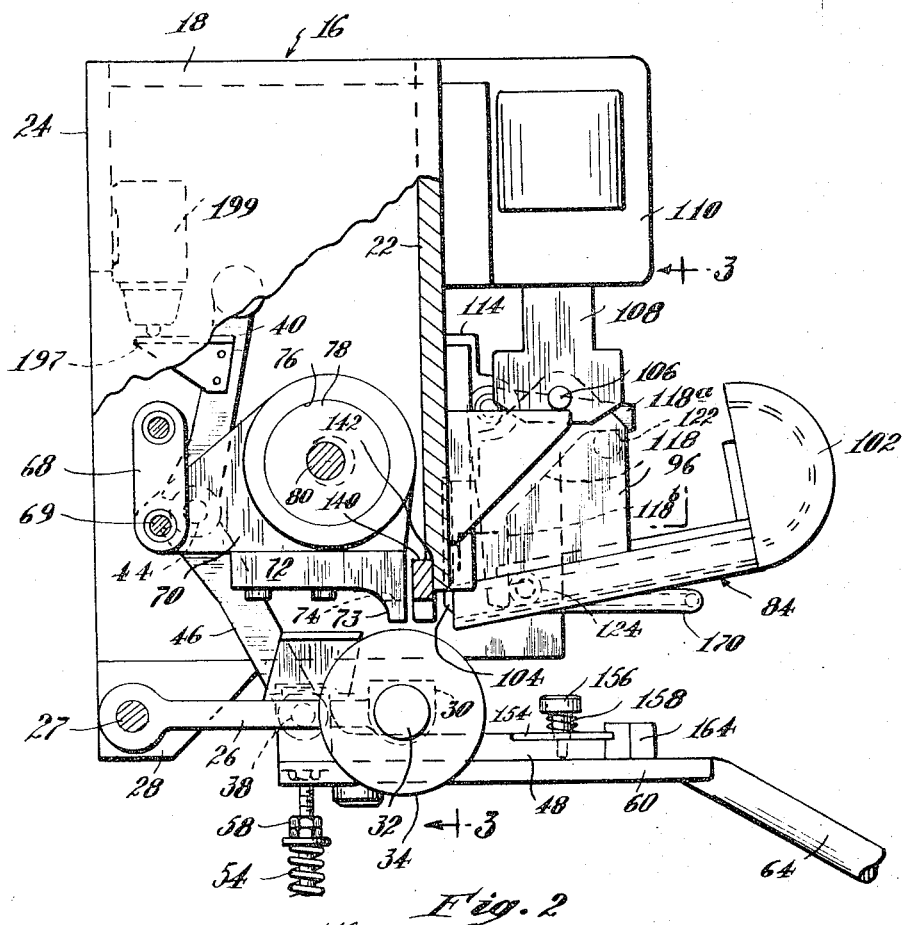
FIG. 2 is a side elevation, to much larger scale, of the head of the machine as seen from the left-hand side of FIG. 1 with parts broken away and parts in section.
Figure 3:
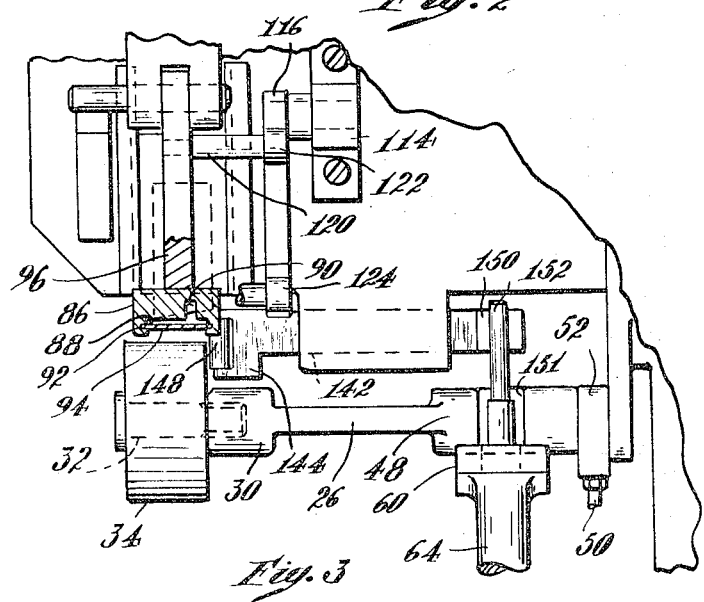
FIG. 3 is an elevation taken on the line 3—3 of FIG. 2 with parts in section.

The rib strip is supplied for application to the insole S, as shown in FIGS. 2 and 3, through a strip guide 84 to the surface of the insole resting on the roller 34 at a point below the feeding feet 73—73. The strip guide 84 comprises an elongate block 86 containing a downwardly facing recess 88 and a groove 90. The rib strip is supplied to the strip guide with the rib laid over against one of the flanges. Consequently, the groove 90, at the entrance to the guide, is made wide enough to accommodate the folded over rib and one side converges from the entrance end toward the other side, as illustrated in FIG. 7, to erect the rib as the strip moves through the guide so that it stands substantially perpendicular to the flanges. As illustrated, the right-hand wall of the groove 90 is straight throughout its length and is adapted to have engagement with the outer side of the rib. The left-hand wall of the groove represented at 90a converges from a spacing corresponding to the width of the laid over rib to a spacing corresponding to the thickness of the rib. The bottom of the strip guide is closed by a bottom plate 94 positioned in groove 92—92 in the opposite walls of the block adjacent their lower edges. Preferably the upper surface of this plate is coated with Teflon to make it smooth and to minimize sticking of the strip within the guide as it is moved therealong. The strip guide slopes toward the roller 34, its lower end terminating close to its top.

The strip guide 84 is fixed relative to the transverse dimension of the roller 34 but is movable vertically with respect thereto. To this end the guide is secured to the lower edge of a flat plate 96 so that it inclines downwardly toward the top of the roller 34. The plate 96 has along its vertical rear edge a plate 98, the opposite edges of which are slidably engaged between grooved guides 100—100 fastened to the front wall 22. A semicircular extension 102 is fixed to the upper end of the guide by means of which the rib strip is lead from a suitable roller into the upper end of the guide. As previously indicated, the rib strip is supplied from the source with the ribs folded down into engagement with one of the flanges, and so that the adhesive-coated underside is facing downwardly as it enters the strip guide.

A cutter, in the form of a thin rigid blade 104 (FIGS. 2 and 4) is set into the front face of the wall 22 behind the plate 98, with its lower edge adjacent the lower end of the strip guide so that its cutting edge is operative, in conjunction with the lower end of the bottom plate 94 when the guide is raised, to effect a shearing action on the tape and thus to cut it off. A guillotine-type of cutter is preferred, that is, the cutting edge of the blade 104 is inclined relative to the cutting edge of the plate 94. The plate 94 or, at least, its edge portion is hardened to provide a suitable cutting edge. Elevation of the strip guide to effect such cutting action is provided by connecting the upper end of the plate 96, by means of a pin 106, to the lower end of the plunger 108 of a solenoid 110 (FIG. 2), the latter being fixed to the front wall 22 of the head above the guide. A bracket 112, having an upper horizontal edge 113, provides a stop by limiting downward movement of the pin 106 hence controlling the heightwise position of the guide 84.

Figure 6:
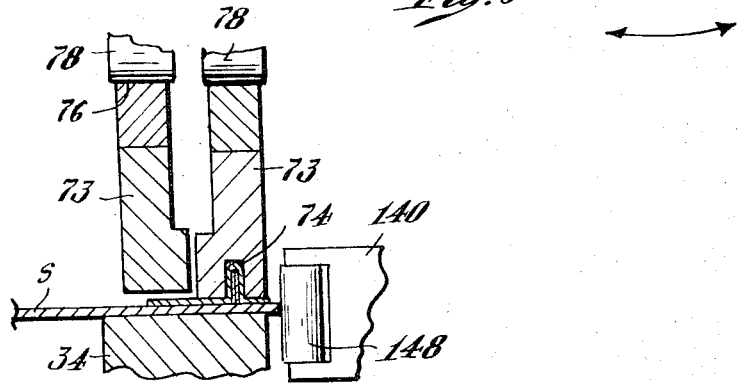
FIG. 6 is a fragmentary vertical section taken on the line 6—6 of FIG. 5.

The rib strip is applied to the upper surface of the insole at different distances from its peripheral edge depending upon the part of the sole to which it is being applied, and means is provided to permit the operator to adjust the disposition of the strip throughout the course of its application to the insole. To this end, a bar 140 (FIGS. 2 and 4) is slidably mounted against the inner side of the front wall 22 in a recess 142 which has at its left-hand end a head 144 notched to receive a roller 148 (FIG. 3) for rotation about a vertical axis, with its surface substantially parallel to the diametrical surface of the roller 34 and with portions extending above and below the peripheral surface thereof (FIG. 6). The right end of the bar 140 is forked at 150 (FIG. 3) so as to receive a pin 152 which is fixed at its lower end to the bar 60 and extends upwardly through an enlarged hole 151 in the arm 48. As previously pointed out, the bar 60 is pivotally supported on the underside of the arm 48 and, by swinging the bar 60 about its pivot, the pin 152 is caused to shift the bar 140 and hence to move the guide roller 148 relative to the support roller 34. Shifting of the guide roller 148 shifts the insole on the support roller 34 relative to the strip guide 84, so that, while the strip is actually fixed and moves along the same path at all times, the insole or other sole member is shifted relative to it so that the application of the rib strip to the insole may be varied relative to its peripheral edge.

Figure 5:
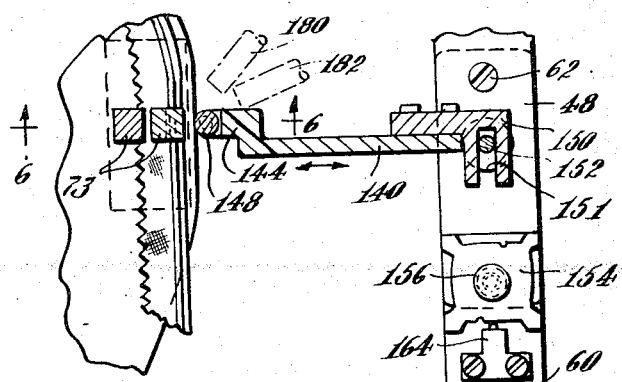
FIG. 5 is a fragmentary horizontal section taken on the line 5—5 of FIG. 1.

A gauge block 154 (FIGS. 2, 4 and 5) is provided for varying the spacing of the strip along the edge of an insole, in accordance with its point of application, and also for providing for soles of different size. The gauge block 154 is pivotally mounted on a pin 156 screwed into the arm 48 with a spring 158 situated between the head of the screw and the gauge block to prevent it from turning. The gauge block has four sides, each of which contains a recess 160, the length of which limits the movement of the roller 148 and hence the extent of the adjustment of the insole relative to the rib strip. A spring-pressed pin 162 (FIGS. 4 and 5), contained within a holder 164, is secured to the bar 60 so that the pin 162 projects into one of the recesses 160 having contact with the bottom 166 of the recess. To facilitate proper positioning, the bottom 166 of each recess contains a notch 168. When the bar 60 is swung to the extreme right-hand side about its pivot so that the pin 162 is engaged with the right-hand end of the recess in one of the sides of the gauge block 154, the roller 148 will occupy the extreme left-hand position and hence, as will be seen by reference to FIG. 6, the tape will be applied at the very edge of the insole. By swinging the bar 60 toward the left until the pin is engaged with the left-hand end of the recess, the roller 148 will be disposed at its furthest right-hand position and hence the strip will be applied at the greatest distance from the peripheral edge of the insole. In accordance with good shoe construction, the strip should be applied at the greatest distance from the peripheral edge along the shank at each side of the sole and at the least distance from the edge between the shank and the toe along each side and at an intermediate distance about the toe end. This intermediate distance is obtained by engaging the pin 162 with the notch 168. The several recesses at the four sides of the gauge block provide for positioning the rib strip on soles of different size.

After the rib strip is applied to the insole and is cut off, it is necessary, since the cut-off takes place at the very end of the strip guide, to advance the strip within the guide far enough forward so that its leading end will be gripped between the walking feet and the upper surface of the insole to enable initiating the next strip applying operation. For this purpose, a bearing 114 (FIGS. 2 and 3) is fastened to the front wall 22 at one side of the strip guide, upon which is pivotally mounted the knee 116 of a bell-crank lever 118 having arms 118a and 118b. A pin 120 is fixed to the plate 96, which has on it a roller 122 situated beneath one arm 118a of the bell-crank lever. A pin 123 (FIGS. 7 and 8) is fixed to a slide 125 slidably mounted in a slot 127 in the side of the strip guide. The pin 123 has on it a roller 124 situated adjacent the other arm 118b of the bell-crank lever. The pin 120 and hence the roller 122 are raised by upward movement of the strip guide as the strip is cut and this, in turn, rocks the bell-crank lever in a counterclockwise direction as shown in FIG. 2. Such counterclockwise movement moves the roller 124 and hence the pin 123, to which it is attached, rearwardly along the strip guide 84. A pawl 131 is pivotally mounted on the slide 125 with an end 133 projecting into the slot 90 adjacent the rib and a part 135 projecting outwardly from and parallel to the slide. A spring 137 is disposed between the outwardly projecting part 135 and the slide so that when the slide is moved rearwardly the part 133 pivots in a clockwise direction and hence slides along the strip without binding. When the cutting operation is completed and the bell-crank lever is rotated to its initial position, a spring 139, supported on a rod 149 between the end of the slot 127 and the slide 125, advances the slide toward the lower end of the strip guide. Forward movement of the slide causes the pawl to swing counterclockwise and thereby press the part 133 against the rib sufficiently hard to force the strip forwardly along the guide and thus project the cut end of the strip from the guide into a position for feeding.

It is customary to apply the strip by means of adhesive a (FIGS. 12 and 14) applied to the lower surface of the strip and/or to the upper surface of the insole at the margin. Preferably, the adhesive is applied to the parts before they are brought together and is normally not tacky and has to be activated to become tacky by the application of heat. In accordance with this invention, heat is supplied both to the strip and to the insole. Heat is applied to the undersurface of the strip through a jet pipe 170 (FIG. 2), one end of which is connected to a heater 172 (FIG. 1) fastened to the front wall 22 and the other end of which is in communication with the recess 88 in the underside of the strip guide 86, preferably through a hole formed in the bottom plate 94. An additional jet pipe 174, also connected at one end to the heater, has its other end supported just above the upper surface of the roller 34 between the feeding feet and the lower end of the strip guide, so as to eject warm air onto the upper surface of the sole at approximately the same time that the strip is engaged with the sole. The two heating devices, in conjunction, provide sufficient warmth to activate the adhesive without rendering it so sticky as to interfere with proper feeding of the strip or of scraping off of the adhesive within the strip guide. Furthermore, as previously pointed out, the upper surface of the bottom plate 94 is coated with Teflon to minimize any tendency of the strip to stick as it is moving through the guide.

Cut-off of the strip may be effected by the operator by means of a foot treadle or it may be effected automatically, the latter being preferred. If a foot treadle is employed it operates through suitable linkage to close a switch which, in turn, energizes the solenoid referred to above. Automatic cutting-off is provided by a photosensitive cell and light source 180 and 182 respectively, mounted on a bracket 184 (FIG. 4) secured to the rear side of the bar 142 so as to be movable therewith relative to the ege of the sole and to always bear the same relation to the edge guide 148. The photosensitive cell and light source 180 and 182 are placed angularly with respect to each other so that a beam of light, projected by the light source 182, striking the edge of the sole will be reflected therefrom into the photosensitive cell 180. The edges of the soles are marked adjacent the breast line on one or both sides at a point about one inch in advance of where the tape is to be terminated and these marks operate, when they pass the photosensitive means, to effect operation of the cutter, suitable electrical connections being provided to energize the solenoid 110 when the photosensitive means is excited.

In accordance with the preferred practice, a plurality of insoles are piled one upon another and then a stripe is painted heightwise of the stack at the point desired. Actually, it is only necessary to have the marks at one side since it is only at the point of termination that the cut-off is made. The index mark is illustrated on the edge of the insole as shown in FIG. 13, however, it could be on the top or bottom surface.

The drive for the machine, as previously mentioned, is effected from driving means within the base 10. As herein illustrated, a belt 186 extends from the pulley 82 downwardly about a pulley 188. The pulley 188 is clutched to a drive pulley 190 which, in turn, is driven through suitable belting and pulleys by a motor M. The clutch is engaged by an element 191 fixed to an arm 192 pivotally supported at 193 through a rod 194, the lower end of which is connected to a treadle 196 and is adapted to be raised by depression of the treadle 196. The clutch element comprises a friction disc on the face of the pulley 190 movable into engagement with a corresponding friction disc on the face of the pulley 188. The drive will be effected so long as the treadle 196 is held depressed. When the treadle is released a spring 197 elevates the arm 192 thus drawing the element 191 away from the clutch disc and, at the same time, applying a brake block 199 to the hub of the pulley 188. The motor M also drive a pump P for supplying air under pressure through conductors c to the heaters and from thence through the pipes 170 and 174 to the points of application of the heat. To prevent operation of the cutter when the roller 34 is retracted, and actuator 197 is mounted on the link 40 for engagement with a microswitch 199 fixed to the wall 20, so that the circuit, including the solenoid 110, is only closed when the support 26 is in its horizontal position.

The machine, as thus far described, is designed for the purpose of applying the rib strip to the insole solely by means of adhesive. It is sometimes desirable to reinforce the attachment, particularly if the strip is itself somewhat weak or if the insole stock is weak, by inserting a line of stitching through the outer flange of the strip and the insole during the application of the strip to the insole. Accordingly, an alternative form of apparatus is shown in FIGS. 9, 10 and 11, wherein the support 26, roller 34 and feed feet 73 are replaced by a sewing machine SM mounted in the head, so that the table 200 and feed dog 202 of the sewing machine occupy the position of the upper surface of the roller 34 and a pair of feeding feet 204—204, such as are provided with sewing machines, a hold-down 206 and a needle 208 are situated above the table. The feed feet 204—204 have a walking action perpendicular to and parallel to the table and operate, in conjunction with the feed dogs on the edge of an insole presented thereto, to move it around with reference to the edge guide 148 in the same manner as previously described. In order to assist in supporting the sole on the table, an auxiliary supporting member 203, having an upper horizontal surface 205 in the plane of the table 200, is fixed to the frame. In this form of the invention, the needle will reciprocate vertically with reference to the insole and will, by piercing the margin of the rib strip and the insole, form a line of stitching as the insole is fed. The edge guide 148 is supported by a bar 142 as formerly; however, since the table occupies a fixed heightwise position, the roller, constituting the guide, is vertically much shorter as will be readily seen in FIG. 9. Since the support 26 formerly employed to support the roller 34 for movement into and out of operative position has been eliminated, an arm 48a (FIG. 9) is mounted on the head in place of the arm 48 in a horizontal position. A bar 60a is pivotally fixed to the underside of the arm at 62a and a pin 152a projects upwardly from the bar through an enlarged hole in the arm and is pivotally connected to the right-hand end of the bar 142 by a link 143. A gauge block and a positioning pin, such as disclosed heretofore, are employed for controlling the pivotal movement of the lever and hence the positioning of the edge guide relative to the table.

In the form of the invention, shown in FIG. 2, the solenoid that is employed, for effecting operation of the cutter, is located directly above the strip guide. However, for the sake of expediency in construction the solenoid, in the form of the invention illustrated in FIGS. 9, 10 and 11, is mounted to the right of the strip guide and the plunger 108 is connected by a link 207 to a horizontally disposed bar 209, one end of which is pivotally supported at 211 on the front wall of the head and the other end of which is connected by a link 213 to the upper end of the plate 96. In other respects, the two apparatus are similar in construction and operation. A simple wiring diagram including the photosensitive device and the limit switch is shown in FIG. 15 for controlling the operation of the cutter, suitable leads being provided to supply the circuit with power.

It should be understood that the present disclosure is for the purpose of illustration only and that this invention includes all modifications and equivalents which fall within the scope of the appended claims.

I claim:

1. The combination with a rib-applying machine comprising a sole support, an edge guide and means cooperable with the sole support, by engagement with the margin of the sole on the support, to move the peripheral edge of the sole lengthwise relative to the edge guide, a strip guide for conducting a strip to a position for engagement with the sole at the place of engagement of the first means therewith; of a support on which the edge guide is fixed, said support being movable at right angles to the direction of movement of the sole, a pivoted lever connected to the support for shifting the support and hence the edge guide relative to the sole support, and a gauge block cooperable with the lever to control the movement thereof between maximum and minimum limits for location of the strip on the sole relative to its edge, said guage block containing a plurality of recesses of different lengths selectively cooperable with the lever to limit its pivotal movement, each recess representing the limit of the displacement of the strip relative to the edge of the insole.

2. Apparatus for applying a rib strip comprising a sole support, an edge guide, and means cooperable with the sole support, by engagement with the margin of the sole on the sole support, to move the peripheral edge of the sole lengthwise of the edge guide, an arm supporting the sole support adjacent the first means, said arm being movable to retract the sole support, a bar mounted on the arm for movement therewith, said bar supporting the edge guide adjacent the sole support and being movable thereon to effect movement of the edge guide relative to the sole support, a lever mounted on the arm with an end pivotally engaged with the bar, said lever having a handle which may be grasped to move the arm into operative position and to be swung about its pivot to position the edge guide relative to the sole support, and means on the arm and lever comprising a fixed spring-pressed detent and a rotatable gauge block, said detent and gauge block being cooperable by rotation of the guage block relative to the detent to limit the extent of pivotal movement of the lever in accordance with the size of the insole.

3. Apparatus according to claim 2, comprising a rod pivotally connected at its upper end to the arm and slidably supported at its lower end in a bracket, a spring mounted on the rod one end engaged with an adjustable abutment on the rod and the other end engaged with the bracket, said spring means normally holding the arm in its operative position, and a toggle connected to the arm operative, by movement of the arm to its inoperative position, to hold the arm in said inoperative position in opposition to the spring.

4. In a rib-applying machine comprising a sole support, an edge guide and feeding means cooperable with the sole support, by engagement with the margin of the sole on the support, to move the peripheral edge of the sole lengthwise relative to the edge guide, and a strip guide for conducting a strip to a position for engagement with the insole at the place of application of the first means, said edge guide being supported for movement widthwise of the strip to effect displacement of the sole relative to the strip, and said support being freely movable by the operator throughout peripheral movement of the sole relative to the edge guide to permit spacing the strip at different distances from the edge according to the position of the sole to which it is being applied at any given time, and said feeding means comprising a pair of feed feet disposed vertically above the sole support for rectilinear walking action, and means for effecting such rectilinear movement comprising a pair of plates to which the feet are secured, a pair of links pivotally secured at one end to the plates for movement of the plates about a first axis located above and parallel to the sole support, means pivotally supporting the other ends of the links for pivotal movement on a second axis parallel to and above the sole support, said second axis being situated above the first axis, said plates containing holes, and eccentrics disposed in said holes in the plates rotatable about an axis situated between the feet and said first and second axes of the plates.

5. A rib-applying machine comprising a sole support, an edge guide, means cooperable with the sole support, by engagement with the margin of the sole on the sole support, to move the peripheral edge of the sole relative to the edge gauge, a strip guide for conducting a strip to a position for engagement with the insole at the place of engagement of the first-named means therewith, means mounting the strip guide in a fixed position transversely of the sole support for movement vertically with respect to the sole support, said strip guide having a bottom wall which, at its forward end at least, is hardened to provide a cutting edge, a shearing blade supported adjacent the end of the strip guide above the bottom plate, and means for effecting elevation of the strip guide to shear the strip where it emerges from the guide between said bottom wall and the shear blade.

6. A rib-applying machine comprising a sole support, an edge guide, means cooperable with the sole support, by engagement with the margin of the sole on the support, to move the peripheral edge of the sole relative to the edge gauge, a strip guide for conducting a strip to a position for engagement with the insole at the place of engagement of the first-named means therewith, a cutter for severing the tape at its point of emergence from the guide, a pin supported on the guide for movement lengthwise thereof with a portion projecting into the strip guide, said pin being slidable along the strip in the direction opposite to the direction of feed and engageable with the strip in the direction of feed, means operable, in consonance with the actuation of the cutter, to move the pin in said first direction, and means operable, following the cutting operation, to move the pin in the second direction to advance the cut end of the strip to and beneath the first means.

7. A rib-applying machine comprising a sole support, an edge guide, means cooperable with the sole support, by engagement with the margin of the sole on the support, to move the peripheral edge of the sole relative to the edge guide, a strip guide for conducting a strip to a position for engagement with the insole at the place of engagement of the first-named means therewith, a cutter for severing the strip at its point of emergence from the guide, said strip guide containing a longitudinal slot, a pin projecting through the slot, a slide movable lengthwise of the slot on which the pin is pivoted, said pin being free to pivot on the slide when the latter is moved along the slot opposite to the direction of feed and to impale the strip when the slide is moved in the direction of feed, a lever operable, in consonance with the cutting of the strip, to retract the slide, and spring means operative on the slide, following retraction, to advance it.

8. A rib-applying machine comprising a sole support, an edge guide, means cooperable with the sole support, by engagement with the margin of the sole on the support, to move the peripheral edge of the sole lengthwise relative to the edge guide, a strip guide for conducting a strip to a position for engagement with the sole at the place of operation of the first-named means, cutter means operable to sever the strip at its place of emergence from the guide, and photosensitive means operative, in response to a mark on the sole, to effect actuation of the cutter, so that the terminal end of the strip will coincide with a predetermined point on the surface of the sole.

9. A rib-applying machine comprising a sole support, an edge guide, means cooperable with the sole support, by engagement with the margin of the sole on the support, to move the peripheral edge of the sole lengthwise relative to the edge guide, a strip guide for conducting a strip to a position for engagement with the sole at the place of operation of the first-named means, cutter means operable to sever the strip at its point of emergence from the guide, and photosensitive means comprising a light source and a light-sensitive cell disposed at angles to the edge of the sole such that the light from the source will be reflected by the edge of the sole to the sensitive cell and will be modified by a mark on the edge of the sole to change the response of said photosensitive means, and means operable, by the response of said photosensitive means, to effect operation of the cutter.

10. A rib-applying machine comprising a sole support, an edge guide, means cooperable with the sole support, by engagement of the margin of the sole with the support, to move the peripheral edge of the sole lengthwise relative to the edge guide, a strip guide for conducting a strip to a position for engagement with the sole at the place of operation of the first-named means, said edge guide being movable relative to the sole support to displace the sole widthwise with respect to the strip, and photosensitive means mounted on the support for the edge guide so as to have a constant relation to the edge of the sole and to be movable with the edge guide.

11. A rib-applying machine comprising a sole support, an edge guide, means cooperable with the sole support, by engagement with the margin of the sole on the support, to move the peripheral edge of the sole lengthwise relative to the edge guide, a strip guide for conducting a strip to a position for engagement with the sole at the place of operation of the first-named means, means for severing the strip at its place of emergence from the strip guide, said sole support being movable into and out of operative position with respect to said first means, and means rendering the last means inoperative so long as the sole support is in its inoperative position.

12. A rib-applying machine comprising a sewing machine having a feed table, an edge guide adjacent an edge of the feed table, said feed table containing a pair of feed dogs, a pair of feed feet arranged opposite the feed dogs cooperable therewith to advance a sole along the table relative to the edge guide, a strip guide for conducting a strip to the table for application to the sole at the place of cooperation of the feed dogs and feed feet, said sewing machine including a needle operable, in conjunction with the feed dogs and feed feet, to insert a line of stitching in the edge of the strip at the outer side of the rib, means for activating the adhesive on the strip and insole as the strip is applied to the insole, and means for severing the strip.

13. In a rib-applying machine comprising a sole support, an edge guide, means cooperable with the sole support, by engagement with the margin of the sole on the support, to move the peripheral edge of the sole lengthwise relative to the edge guide, and a strip guide for conducting a strip to a position for engagement with the insole at the place of application of the first means; means supporting the edge guide for movement widthwise of the strip to effect displacement of the sole relative to the strip, said means being freely movable by the operator throughout peripheral movement of the sole relative to the edge guide to permit spacing the strip at different distances from the edge according to the position of the sole to which it is being applied at any given time; said strip guide having a strip receiving recess adapted to receive the strip, with the rib laid over against the flange at one side, and a groove having one side converging rearwardly toward the other operable to erect the rib as the strip is advanced therealong.

14. In a rib-applying machine comprising a sole support, an edge guide, means cooperable with the sole support, by engagement with the margin of the sole on the support, to move the peripheral edge of the sole lengthwise relative to the edge guide, and a strip guide for conducting a strip to a position for engagement with the insole at the place of application of the first means; means supporting the edge guide for movement widthwise of the strip to effect displacement of the sole relative to the strip, said means being freely movable by the operator throughout peripheral movement of the sole relative to the edge guide to permit spacing the strip at different distances from the edge according to the position of the sole to which it is being applied at any given time; said strip guide having a strip receiving recess, corresponding in width to the width of the rib strip, adapted to receive the strip, and a groove which, at the entrance end, is sufficiently wide and deep to receive the rib laid over on one side against the strip, one wall of the groove converging rearwardly with respect to the other to a spacing corresponding to the thickness of the rib and operating on the rib as the strip is moved through the guide to erect the rib.

15. In a rib-applying machine comprising a sole supporting table, a feed dog on the table, an edge guide, feeding means cooperable with the feed dog on the table, by engagement with the margin of the sole on the support, to move the peripheral edge of the sole lengthwise relative to the edge guide, a strip guide for conducting a strip to a position for engagement with the insole at the place of application of the first means, means supporting the edge guide for movement widthwise of the strip to effect displacement of the sole relative to the strip, said means being freely movable by the operator throughout peripheral movement of the sole relative to the edge guide to permit spacing the strip at different distances from the edge according to the position of the sole to which it is being applied at any given time, and a needle operable in consonance with the feeding means to insert a line of stitches through the flange of the strip and the insole outwardly of the rib.

16. Apparatus according to claim 15, comprising means for effecting operation of the feed dog, feeding means and needle in consonance to feed the sole and insert a line of stitching through one of the margins of the strip.

References Cited by the Examiner
UNITED STATES PATENTS

| | | | |
|---|---|---|---|
| 2,070,200 | 2/1937 | Ernst | 12—20 X |
| 2,142,332 | 1/1939 | Ridderstrom | 12—20 |
| 2,203,977 | 6/1940 | Bennett | 12—59.5 X |
| 2,635,263 | 4/1953 | Clark | 12—20 |
| 2,875,455 | 3/1959 | Antell | 12—20 |
| 2,903,723 | 9/1959 | Hanson et al. | 12—20 |
| 2,932,834 | 4/1960 | Ridderstrom | 12—20 |
| 2,933,744 | 4/1960 | Latarski et al. | 12—20 |

PATRICK D. LAWSON, *Primary Examiner.*